(12) United States Patent
Hare (10) Patent No.: US 9,247,027 B1
(45) Date of Patent: Jan. 26, 2016

(54) CONTENT VERSIONING IN A CLIENT/SERVER SYSTEM WITH ADVANCING CAPABILITIES

(71) Applicant: Google Inc., Mountain View, CA (US)

(72) Inventor: R. Lawrence Hare, San Jose, CA (US)

(73) Assignee: Google Inc., Mountain View, CA (US)

( * ) Notice: Subject to any disclaimer, the term of this patent is extended or adjusted under 35 U.S.C. 154(b) by 223 days.

(21) Appl. No.: 14/141,807

(22) Filed: Dec. 27, 2013

(51) Int. Cl.
*G06F 15/16* (2006.01)
*G06F 15/173* (2006.01)
*H04L 29/06* (2006.01)

(52) U.S. Cl.
CPC ...................................... *H04L 67/42* (2013.01)

(58) Field of Classification Search
CPC .............. H04L 67/02; G06F 17/30873; G06F 2216/15; H04N 7/17318; H04H 20/38
USPC .................................. 709/203, 223, 224, 226
See application file for complete search history.

(56) References Cited

U.S. PATENT DOCUMENTS

| | | | |
|---|---|---|---|
| 5,588,148 A * | 12/1996 | Landis et al. | |
| 5,953,506 A * | 9/1999 | Kalra et al. | 709/231 |
| 6,167,441 A * | 12/2000 | Himmel | 709/217 |
| 6,405,219 B2 * | 6/2002 | Saether et al. | |
| 6,470,378 B1 * | 10/2002 | Tracton et al. | 709/203 |
| 2010/0293105 A1 * | 11/2010 | Blinn et al. | 705/319 |

OTHER PUBLICATIONS amazon.com, "Amazon Kindle Publishing Guidelines," 2014, 85 Pages, [online] [retrieved on Aug. 22, 2014] Retrieved from the internet <URL: http://kindlegen.s3.amazonaws.com/AmazonKindlePublishingGuidelines.pdf>.
Wikipedia, "Windows Update," Last modified on Aug. 7, 2014, 9 Pages, [online] [retrieved on Aug. 22, 2014] Retrieved from the internet <URL: http://en.wikipedia.org/wiki/Windows_Update>.
W3C, "Media Queries," Jun. 19, 2012, 26 Pages, [online] [retrieved on Aug. 22, 2014] Retrieved from the internet <URL: http://www.w3.org/TR/css3-mediaqueries/>.

* cited by examiner

*Primary Examiner* — Peling Shaw
(74) *Attorney, Agent, or Firm* — Fenwick & West LLP (57) ABSTRACT

A content item is updated in response to advancing capabilities of a client. A local content item received from a server is stored. The local content item has characteristics customized based on prior capabilities of the client. A determination is made regarding whether current capabilities of the client exceed characteristics of the local content item customized based on the prior capabilities of the client. Responsive to determining that the current capabilities of the client exceed the characteristics of the local content item, an updated content item having characteristics customized based on the current capabilities of the client is requested from the server. The updated content item is stored as an updated local content item.

20 Claims, 5 Drawing Sheets

CONTENT VERSIONING IN A CLIENT/SERVER SYSTEM WITH ADVANCING CAPABILITIES

BACKGROUND

1. Technical Field

The subject matter described herein generally relates to the field of a client/server system where a server customizes content before sending the content to a client and, in particular, to a system where content is customized based on a client's capabilities.

2. Background Information

Consider a client/server system where a server sends content to multiple clients. Different clients have different capabilities or feature sets. In order to provide a better user experience, the server customizes or tailors content based on a particular client's capabilities before sending the content to that particular client. The client stores the received content for future use by a user.

At some point, a client's capabilities change. Content previously received (and then stored) by the client was customized based on the client's previous capabilities (e.g., the client's capabilities at the time the content was requested from the server). The client's new capabilities are more advanced. Specifically, if the same content were requested again, the server would customize the content differently due to the client's different capabilities. If the client presents previously-stored content (customized based on the client's previous capabilities), then the user experience is diminished compared to the client presenting newly-requested content (customized based on the client's new capabilities).

SUMMARY

The above and other issues are addressed by a method, non-transitory computer-readable storage medium, and system for updating a content item in response to advancing capabilities of a client. An embodiment of the method comprises storing a local content item received from a server. The local content item has characteristics customized based on prior capabilities of the client. The method further comprises determining whether current capabilities of the client exceed characteristics of the local content item customized based on the prior capabilities of the client. The method further comprises, responsive to determining that the current capabilities of the client exceed the characteristics of the local content item, requesting from the server an updated content item having characteristics customized based on the current capabilities of the client. The method further comprises storing the updated content item as an updated local content item.

An embodiment of the medium stores computer program modules executable to perform steps. The steps comprise storing a local content item received from a server. The local content item has characteristics customized based on prior capabilities of the client. The steps further comprise determining whether current capabilities of the client exceed characteristics of the local content item customized based on the prior capabilities of the client. The steps further comprise, responsive to determining that the current capabilities of the client exceed the characteristics of the local content item, requesting from the server an updated content item having characteristics customized based on the current capabilities of the client. The steps further comprise storing the updated content item as an updated local content item.

An embodiment of the system comprises a non-transitory computer-readable storage medium storing computer program modules executable to perform steps. The steps comprise storing a local content item received from a server. The local content item has characteristics customized based on prior capabilities of the client. The steps further comprise determining whether current capabilities of the client exceed characteristics of the local content item customized based on the prior capabilities of the client. The steps further comprise, responsive to determining that the current capabilities of the client exceed the characteristics of the local content item, requesting from the server an updated content item having characteristics customized based on the current capabilities of the client. The steps further comprise storing the updated content item as an updated local content item.

DETAILED DESCRIPTION

The Figures (FIGS.) and the following description describe certain embodiments by way of illustration only. One skilled in the art will readily recognize from the following description that alternative embodiments of the structures and methods illustrated herein may be employed without departing from the principles described herein. Reference will now be made to several embodiments, examples of which are illustrated in the accompanying figures. It is noted that wherever practicable similar or like reference numbers may be used in the figures and may indicate similar or like functionality.

Figure 1:
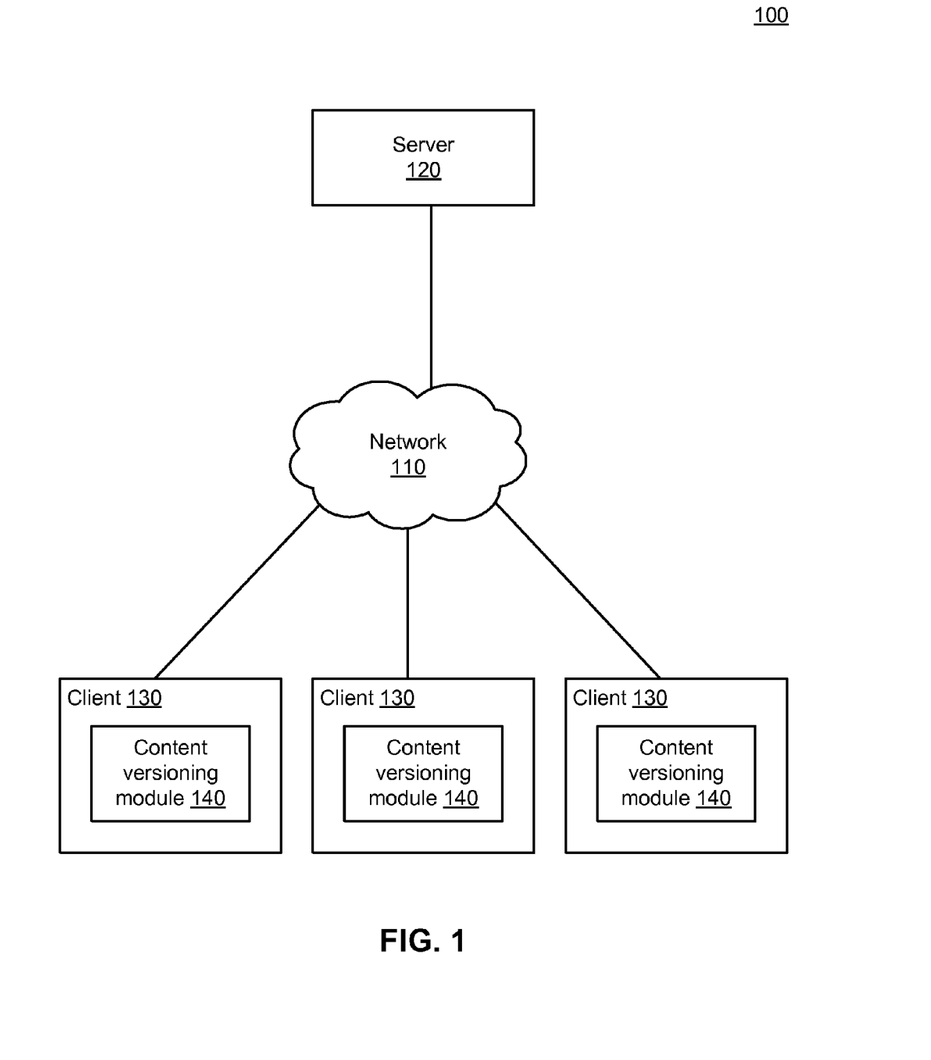
FIG. 1 is a high-level block diagram illustrating an environment for content versioning in a client/server system with advancing capabilities, according to one embodiment.

FIG. 1 is a high-level block diagram illustrating an environment 100 for content versioning in a client/server system with advancing capabilities, according to one embodiment. The environment 100 may be maintained by an enterprise (e.g., a corporation) that enables a user to obtain digital content from an online store (e.g., an online book store, an online multimedia store, or an online application store ("app store")), store the content, and experience the stored content using a client 130. The content is, for example, an electronic book ("ebook"), multimedia (graphics and/or audio), or an application. As shown, the environment 100 includes a network 110, a server 120, and multiple clients 130. While one server 120 and three clients 130 are shown in the embodiment depicted in FIG. 1 for clarity, other embodiments can have different numbers of servers 120 and/or clients 130.

The network 110 represents the communication pathway between the server 120 and the clients 130. In one embodiment, the network 110 uses standard communications technologies and/or protocols and can include the Internet. Thus, the network 110 can include links using technologies such as Ethernet, 802.11, worldwide interoperability for microwave access (WiMAX), 2G/3G/4G mobile communications protocols, digital subscriber line (DSL), asynchronous transfer mode (ATM), InfiniBand, PCI Express Advanced Switching, etc. Similarly, the networking protocols used on the network 110 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), etc. The data exchanged over the network 110 can be represented using technologies and/or formats including image data in binary form (e.g. Portable Network Graphics (PNG)), hypertext markup language (HTML), extensible markup language (XML), etc. In addition, all or some of the links can be encrypted using conventional encryption technologies such as secure sockets layer (SSL), transport layer security (TLS), virtual private networks (VPNs), Internet Protocol security (IPsec), etc. In another embodiment, the entities on the network 110 can use custom and/or dedicated data communications technologies instead of, or in addition to, the ones described above.

A client 130 is a computer (or set of computers) that obtains content from the server 120, stores content, and presents content to an end-user. The client 130 can be, for example, a tablet computer or a smart phone. The content can be of various types. In one embodiment, the content is an ebook, and the client 130 displays the ebook to the user by executing electronic book reading software (an "ereader"). In another embodiment, the content is multimedia, and the client 130 displays the multimedia to the user by executing multimedia playing software. The client 130 has particular capabilities or a particular feature set (generally, "capabilities"), which can change over time. The client 130 sends the server 120 a request for content. That content request identifies that client's current capabilities. The client 130 receives from the server 120 a) content that has been customized or tailored (generally, "customized") based on those capabilities and b) an indication of the characteristics of the customized content. The client 130 stores the received content for future use by a user and also stores the indication. Storing the received content locally at the client 130 enables the content to be used anytime, such as when the client 130 is not connected to the network 110 or when the client 130 is connected to the network 110 but the network connection is slow and/or expensive to use.

A client 130 includes a content versioning module 140. The content versioning module 140 enables the client 130 to present content that has been customized based on the client's current capabilities. Recall that content received (and stored) by a client was customized based on the client's capabilities at that point in time. The client's capabilities might have advanced since then. The user's overall content consumption experience would be better if the client presented content that was customized based on the client's current capabilities rather than the client's prior capabilities (e.g., the client's capabilities when the content was requested from the server 120). In one embodiment, the content versioning module 140 evaluates local content stored at the client 130, evaluates content stored at the server 120, and updates the local content if appropriate. The content versioning module 140 is further described below with reference to FIGS. 4 and 5.

The server 120 is a computer (or set of computers) that sends a client 130 content that has been customized based on that client's capabilities. For example, the server 120 receives a request for content that identifies a client's current capabilities. In response, the server 120 sends the client 130 the requested content (customized based on those capabilities) and an indication of how the content was customized. The server 120 is further described below with reference to FIGS. 3 and 5.

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by the server.

Figure 2:
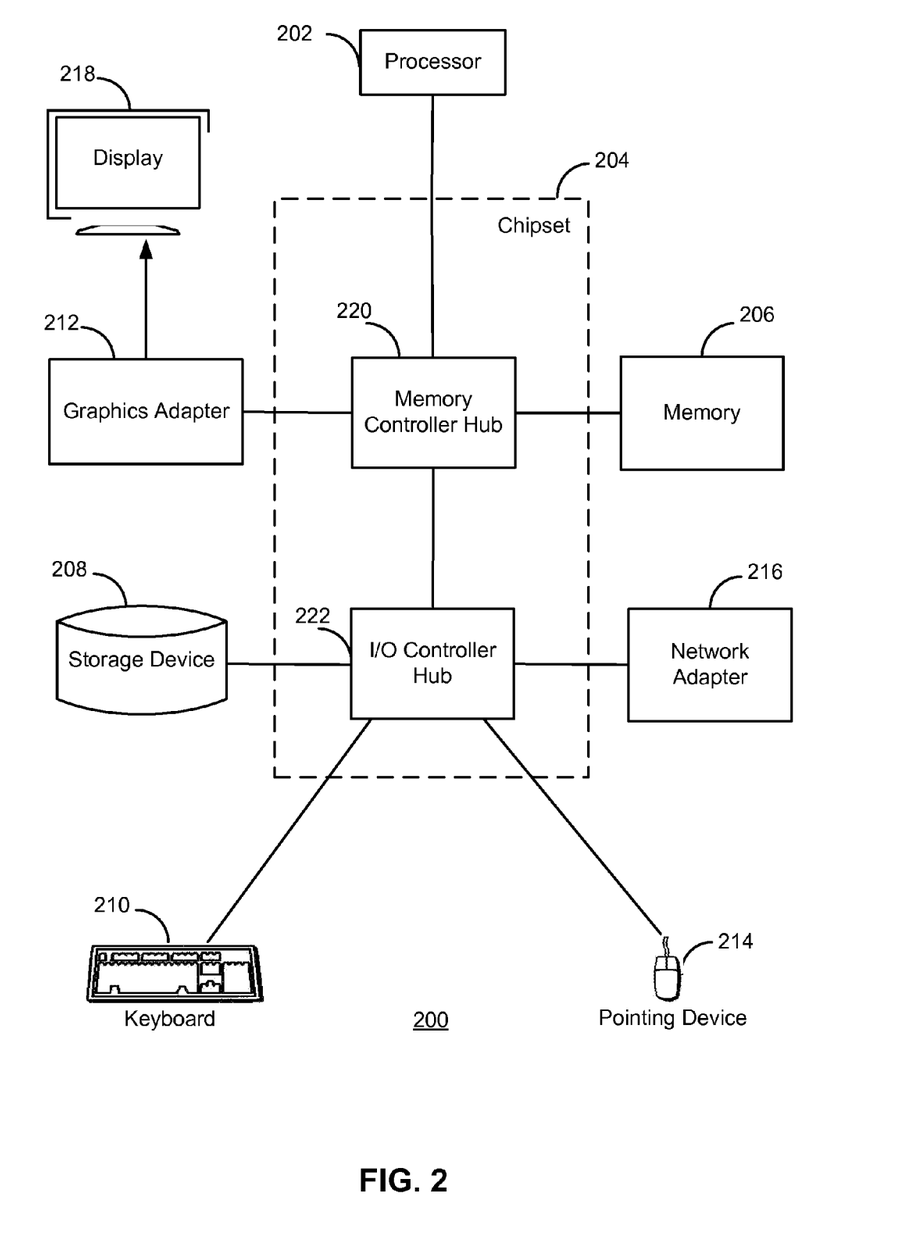
FIG. 2 is a high-level block diagram illustrating an example of a computer for use as one or more of the entities illustrated in FIG. 1, according to one embodiment.

FIG. 2 is a high-level block diagram illustrating an example of a computer 200 for use as one or more of the entities illustrated in FIG. 1, according to one embodiment. Illustrated are at least one processor 202 coupled to a chipset 204. The chipset 204 includes a memory controller hub 220 and an input/output (I/O) controller hub 222. A memory 206 and a graphics adapter 212 are coupled to the memory controller hub 220, and a display device 218 is coupled to the graphics adapter 212. A storage device 208, keyboard 210, pointing device 214, and network adapter 216 are coupled to the I/O controller hub 222. Other embodiments of the computer 200 have different architectures. For example, the memory 206 is directly coupled to the processor 202 in some embodiments.

The storage device 208 includes one or more non-transitory computer-readable storage media such as a hard drive, compact disk read-only memory (CD-ROM), DVD, or a solid-state memory device. The memory 206 holds instructions and data used by the processor 202. The pointing device 214 is used in combination with the keyboard 210 to input data into the computer system 200. The graphics adapter 212 displays images and other information on the display device 218. In some embodiments, the display device 218 includes a touch screen capability for receiving user input and selections. The network adapter 216 couples the computer system 200 to the network 110. Some embodiments of the computer 200 have different and/or other components than those shown in FIG. 2. For example, the server 120 can be formed of multiple blade servers and lack a display device, keyboard, and other components, while the client 130 can be a notebook or desktop computer, a tablet computer, or a mobile phone.

The computer 200 is adapted to execute computer program modules for providing functionality described herein. As used herein, the term "module" refers to computer program instructions and/or other logic used to provide the specified functionality. Thus, a module can be implemented in hardware, firmware, and/or software. In one embodiment, program modules formed of executable computer program instructions are stored on the storage device 208, loaded into the memory 206, and executed by the processor 202.

Figure 3:
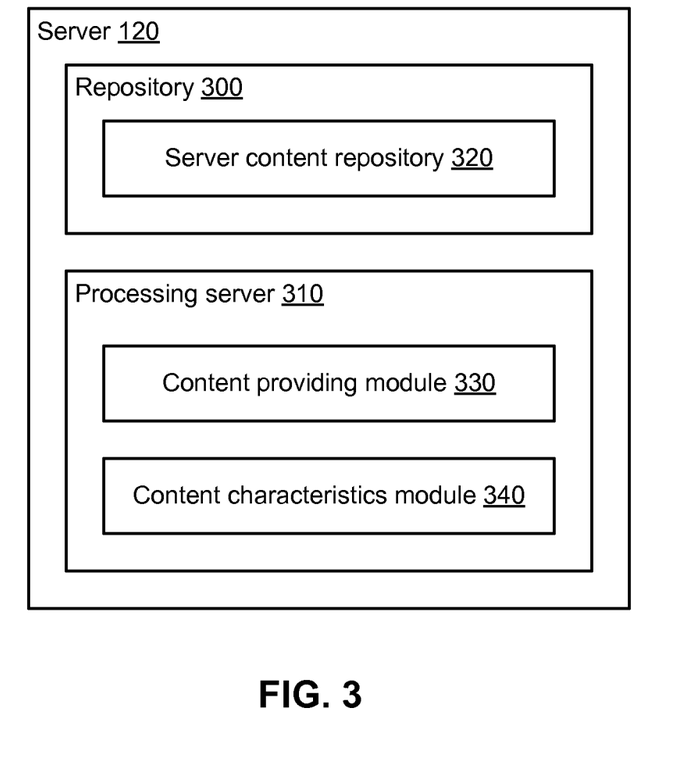
FIG. 3 is a high-level block diagram illustrating a detailed view of a server, according to one embodiment.

FIG. 3 is a high-level block diagram illustrating a detailed view of a server 120, according to one embodiment. The server 120 includes a repository 300 and a processing server 310. The repository 300 is a computer (or set of computers) that stores a server content repository 320. In one embodiment, the repository 300 includes a server that provides the processing server 310 access to the server content repository 320 in response to requests.

The server content repository 320 stores content items and characteristics of those content items. A content item is stored in the server content repository 320 in its "native" format (i.e., the content item has not been customized based on a particular client's capabilities). The characteristics of a content item indicate one or more "specialized" types of content that exist within the content item. A specialized content type is, for example, content that uses a particular encoding or adheres to a particular standard.

As mentioned above, content can be of various types. In one embodiment, a content item is an ebook (either an entire ebook or a portion thereof, such as one chapter or a portion of one chapter). One content item can include one or more specialized content types such as Mathematical Markup Language (MathML), Scalable Vector Graphics (SVG), audio, video, Electronic Publication (EPUB), etc. The characteristics of a content item indicate whether that content item includes the various specialized content types (MathML, SVG, audio, video, EPUB, etc.).

One content item can include multiple files, such as book text, images, and fonts. In one embodiment, the characteristics of such a multi-file content item describe the content item as a whole (i.e., whether the collection of multiple files includes the various specialized content types). In another embodiment, the characteristics of such a multi-file content item describe the files separately (e.g., whether each of the multiple files includes the various specialized content types). If the characteristics describe the files separately, then it is possible to determine that only a particular file needs to be updated, rather than the entire multi-file content item.

In one embodiment, content characteristics are represented as a group of one or more name-value pairs. A name indicates a specialized content type, and a value indicates whether that specialized content type is absent or present (or present in a particular form). A name-value pair can be represented as a string, such as "name=value". Examples of name-value pair strings and their meanings are:
mathml=0 does not contain MathML
svg=1 does contain SVG
audio=1 does contain audio
video=2 does contain video (in a particular form)
epub=1 does contain EPUB
In the above examples, a value is an integer that indicates whether that specialized content type is absent (0), present (1), or present in a particular form (2 or greater).

Multiple name-value pair strings can be separated by commas and concatenated to form one larger string. The name-value pair string examples above would form "mathml=0, svg=1,audio=1,video=2,epub=1" as the larger string, which would then be stored as the content characteristics. The content characteristics string can be simplified by using an implicit ordering of specialized content types. For example, if MathML is always listed first, followed by SVG, audio, video, and EPUB (in that order), then the previous string can be simplified as "0.1.1.2.1". Alternatively, a bit string can be used, where a particular specialized content type is assigned a particular location within the bit string, such as:
0x1—MathML
0x2—SVG
0x4—audio
0x8—video
0x10—EPUB The processing server 310 includes various modules such as a content providing module 330 for providing content items and a content characteristics module 340 for providing characteristics of a content item. In one embodiment, the processing server 310 includes a computer (or set of computers) that communicates with the repository 300 and processes data (e.g., by executing the content providing module 330 and the content characteristics module 340). In one embodiment, the processing server 310 includes a web server that responds to requests from a client 130.

The content providing module 330 sends a client 130 a content item that has been customized based on that client's capabilities. For example, the content providing module 330 receives a request from a client 130 for a content item. The request identifies the client's current capabilities (e.g., with respect to various specialized content types). For example, the capabilities indicate to what extent the client 130 is able to "support" (e.g., process or interpret) various specialized content types. A value of 0 indicates that the client 130 does not support the specialized content type at all; a value of 1 indicates that the client 130 supports the specialized content type at a first level; a value of 2 indicates that the client 130 supports the specialized content type at a second level; and so on. A client's current capabilities can be expressed as, for example, a string of name-value pairs, a string of values with an implicit ordering of specialized content types, or a bit string with particular locations for particular specialized content types. In one embodiment, a client's current capabilities are expressed in the same format as the content characteristics stored in the server content repository 320.

In response to receiving the content request, the content providing module 330 obtains from the server content repository 320 the requested content item (in its native format) and that content item's characteristics. The content providing module 330 then determines how to customize the native-format content item. This determination is performed by comparing the native-format content item's characteristics (obtained from the server content repository 320) and the client's capabilities (identified in the content request). Specifically, the content providing module 330 determines, for each specialized content type, the maximum level of functionality that is both present in the content item (specified by the content item's characteristics) and supported by the client (specified by the client's capabilities). For example, for a particular specialized content type, if the content item characteristics have a value of 2 (meaning that specialized content type is present in a particular form) and the client capabilities have a value of 1 (meaning that specialized content type is supported but at a different level), then the maximum level of functionality for that specialized content type is 1. The resulting maximum levels of functionality specify the characteristics of the customized content item (referred to as "customization characteristics") which, in turn, determine how the native-format content item should be customized for a particular client.

Note that if the content item characteristics and the client capabilities are expressed as strings of values, then the customization characteristics are given by the "minimum" function for each specialized content type. If the content item characteristics and the client capabilities are expressed as bit strings with the same locations for specialized content types, then the customization characteristics are given by the Boolean "and" function of the characteristics and the capabilities.

The content providing module 330 customizes the native-format content item according to the customization characteristics and sends the client 130 the customized content item and the customization characteristics. In one embodiment, the content providing module 330 also sends the client 130 the characteristics of the native-format content item. In another embodiment, the content providing module 330 also caches the customized content item and its customization characteristics. This way, if the same content item is to be customized according to the same customization characteristics at some point in the future, then the cached customized content item can be used instead of customizing the content item all over again, which saves time.

The content providing module 330 determines which specialized content types have content item characteristics values that exceed customization characteristics values and customizes the specialized content of those types. Specifically, for a particular specialized content type, if the content item characteristics value exceeds the customization characteristics value, this means that the client 130 does not support the specialized content in its native format. So, the content providing module 330 converts the specialized content to a simpler format that the client 130 supports.

The content providing module 330 converts the native-format specialized content to adhere to the customization characteristics, which represent the maximum level of functionality that is both present in the native-format content item and supported by the client. For example, for a particular specialized content type, if the content item characteristics have a value of 2 and the customization characteristics have a value of 1, then the content providing module 330 converts that native-format specialized content to the level-1 format. In one embodiment, the simplest (i.e., level-0) format is supported by all clients 130 regardless of their capabilities. For example, the level-0 format is an image file that adheres to the JPEG standard, which is supported by all client devices.

If the content item characteristics value equals the customization characteristics value, this means that the client 130 supports the specialized content in its native format. So, the content providing module 330 does not convert the specialized content. As a result, the client 130 will receive the specialized content in its native format.

Consider a native-format content item that contains MathML (markup language text that represents a mathematical expression). The content item characteristics have a value of 1 for MathML specialized content, indicating that MathML content is present. If the customization characteristics value for MathML specialized content is 0 (indicating that the client does not support MathML at all), then the content providing module 330 converts the MathML specialized content to level-0 format (e.g., an image of the mathematical expression), which all clients support. If the customization characteristics value for MathML specialized content is 1 (indicating that the client supports MathML), then the content providing module 330 does not convert the MathML specialized content.

In one embodiment, the content characteristics module 340 sends a client 130 the characteristics of a native-format content item. For example, the content characteristics module 340 receives a request from a client 130 for the characteristics of a native-format content item stored in the server content repository 320 (which has not been customized based on a particular client's capabilities). In response to receiving the characteristics request, the content characteristics module 340 obtains from the server content repository 320 the characteristics of the requested native-format content item and sends the characteristics to the client 130. In this manner, the content characteristics module 340 provides the client 130 with information that the client can use to determine the characteristics of the native-format (i.e., not customized) content item. As explained above, the characteristics can be expressed as, for example, a string of name-value pairs, a string of values with an implicit ordering of specialized content types, or a bit string with particular locations for particular specialized content types. (In another embodiment, the content characteristics module 340 is omitted because the client 130 previously received the characteristics of the native-format content item from the content providing module 330, as explained above.)

Figure 4:
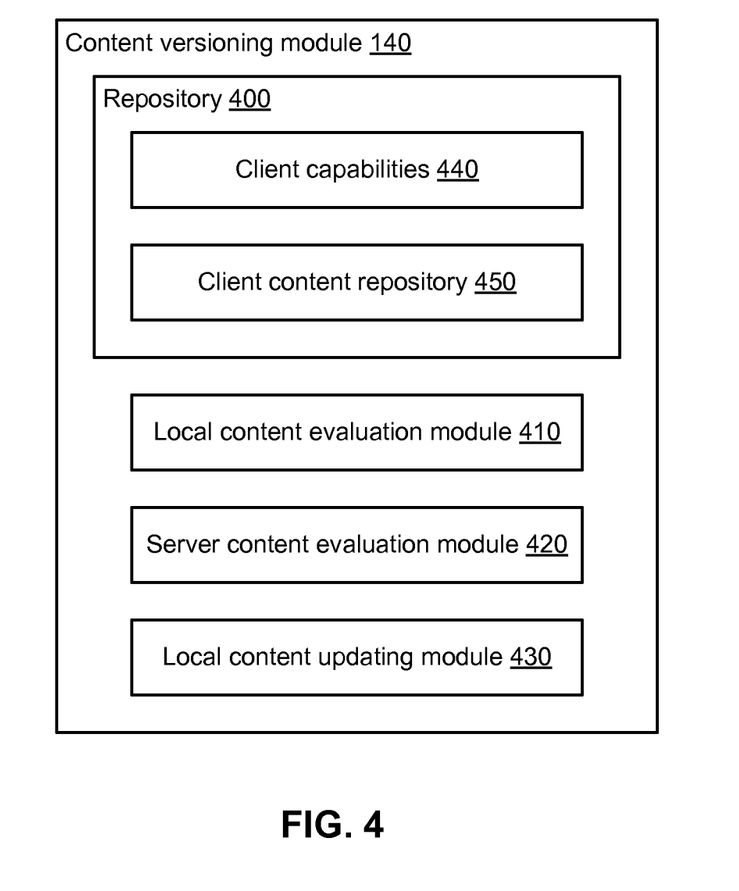
FIG. 4 is a high-level block diagram illustrating a detailed view of a content versioning module of a client, according to one embodiment.

FIG. 4 is a high-level block diagram illustrating a detailed view of a content versioning module 140 of a client 130, according to one embodiment. The content versioning module 140 includes a repository 400, a local content evaluation module 410, a server content evaluation module 420, and a local content updating module 430. The repository 400 stores client capabilities 440 and a client content repository 450.

The client capabilities 440 stores information regarding the client's current capabilities (e.g., with respect to various specialized content types). For example, the client capabilities 440 indicate whether the client 130 is able to "support" (e.g., process or interpret) various specialized content types. The client capabilities 440 can be expressed as, for example, a string of name-value pairs, a string of values with an implicit ordering of specialized content types, or a bit string with particular locations for particular specialized content types. In one embodiment, the client capabilities 440 are expressed in the same format as the content characteristics stored in the server content repository 320.

The client content repository 450 stores content items and their characteristics. For example, the client content repository 450 stores customized content items (and their customization characteristics) that were previously received from the server 120. In one embodiment, the client content repository 450 also stores the characteristics of the corresponding native-format content items, which were received from the content providing module 330, as explained above.

The local content evaluation module 410 evaluates a customized content item stored at the client 130. Specifically, the local content evaluation module 410 determines whether the client's current capabilities exceed the local customized content item's characteristics. In one embodiment, the local content evaluation module 410 performs this determination by obtaining the client's current capabilities from the client capabilities 440 and obtaining the local customized content item's characteristics from the client content repository 450. The client's capabilities and the content item's characteristics are then compared. If a specialized content type exists where the value of the capabilities exceeds the value of the characteristics, then the client's current capabilities do exceed the local content item's characteristics.

The server content evaluation module 420 evaluates a native-format content item stored at the server 120. Specifically, the server content evaluation module 420 checks the client's current capabilities against the server content item's characteristics (i.e., the specialized content types that are present in the server content item). In one embodiment, this determination is performed by obtaining the client's current capabilities (from the client capabilities 440) and obtaining the server content item's characteristics (from the client content repository 450 or by sending a characteristics request to the server 120 (to be handled by the server's content characteristics module 340) that identifies the relevant content item). The client's capabilities and the content item's characteristics are then compared. If a specialized content type exists where the value of the characteristics meets or exceeds the value of the capabilities, then the client's current capabilities "overlap" specialized content types that are present in the server content item.

The local content updating module 430 updates a customized content item stored at the client 130. In one embodiment, the local content updating module 430 obtains the client's current capabilities from the client capabilities 440. The local content updating module 430 then sends a content request to the server 120 (to be handled by the server's content providing module 330) that identifies the relevant content item and the client's capabilities. The local content updating module 430 then receives from the server 120 the relevant content item (customized based on the capabilities) and its customization characteristics and stores them in the client content repository 450. In one embodiment, the local content updating module 430 also receives from the server 120 the characteristics of the corresponding native-format content item and stores them in the client content repository 450.

Figure 5:
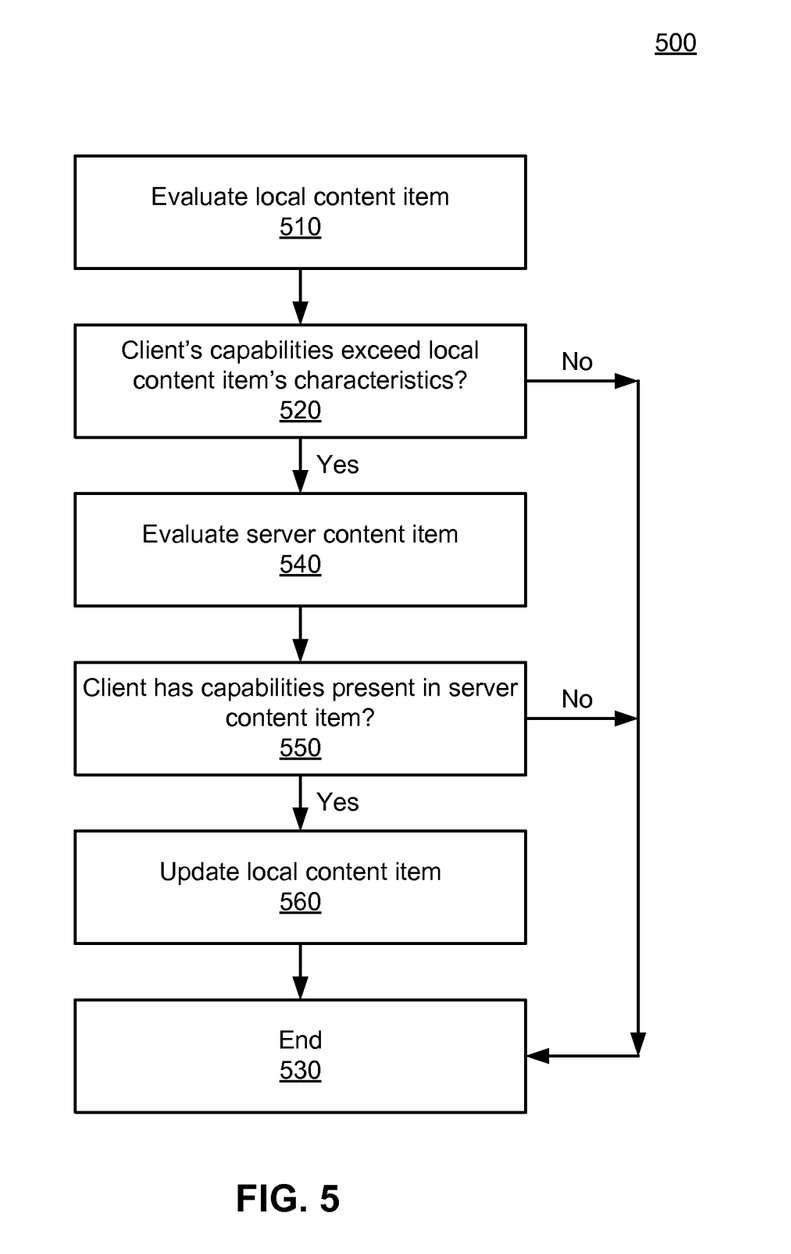
FIG. 5 is a flowchart illustrating a method of updating a content item in response to advancing capabilities of a client, according to one embodiment.

FIG. 5 is a flowchart illustrating a method 500 of updating a content item in response to advancing capabilities of a client, according to one embodiment. In one embodiment, the method 500 is performed in response to receiving a user request to experience a content item that is stored locally at the client 130 (e.g., within the client content repository 450) or in anticipation of receiving such a request. In another embodiment, the method 500 is performed in response to a change in the client's capabilities (e.g., due to an update of the ereader software or the multimedia playing software), as indicated by a change in the client capabilities 440. In other embodiments, the method 500 is performed periodically or in response to occurrences of other events. In one embodiment, performance of the method 500 is delayed until a fast and/or cheap network connection is available to the client 130. Other embodiments can perform the steps in different orders and can include different and/or additional steps. In addition, some or all of the steps can be performed by entities other than those shown in FIG. 1.

When the method 500 starts, a client's current capabilities have already been stored in the client capabilities 440 of the client repository 400. Also, the requested content item and its customization characteristics have already been stored in the client content repository 450 as a local content item (e.g., as the result of a previously-received response from the server 120). The local content item has characteristics that were customized based on prior capabilities of the client (e.g., characteristics that were customized based on the client's capabilities when the content item was requested from the server 120). In other words, the local content item is not identical to the corresponding native-format server content item. The client's prior capabilities were insufficient to support the corresponding native-format server content item, so the corresponding native-format server content item was customized before it was sent to the client. At this point, the method 500 begins.

In step 510, the local content item is evaluated. For example, the local content evaluation module 410 compares the client's current capabilities and the local content item's characteristics.

In step 520, a determination is made regarding whether the client's capabilities exceed the local content item's characteristics. For example, the local content evaluation module 410 determines whether a specialized content type exists where the value of the capabilities exceeds the value of the characteristics. In one embodiment, the local content evaluation module 410 determines whether the capabilities exceed the characteristics that were customized based on the prior capabilities of the client. If the client's capabilities do not exceed the local content item's characteristics, then the method 500 proceeds to step 530 and ends.

If the client's capabilities do exceed the local content item's characteristics, then the method 500 proceeds to step 540. In step 540, the (native-format) server content item is evaluated. For example, the server content evaluation module 420 compares the client's current capabilities and the characteristics of the server content item.

In step 550, a determination is made regarding whether the client's capabilities "overlap" specialized content types that are present in the native-format server content item. For example, the server content evaluation module 420 determines whether a specialized content type exists where the value of the characteristics meets or exceeds the value of the client's capabilities. In one embodiment, the server content evaluation module 420 determines whether the client's capabilities support a characteristic of the server content item, where that characteristic of the server content item exceeds the characteristic of the local content item. If the client's capabilities do not overlap specialized content types that are present in the server content item, then the method 500 proceeds to step 530 and ends. If the client's capabilities do overlap specialized content types that are present in the server content item, then the method 500 proceeds to step 560.

In step 560, the local content item is updated. For example, the local content updating module 430 sends a content request to the server 120 that identifies the relevant content item and the client's current capabilities. The local content updating module 430 then receives from the server 120 the relevant content item (customized based on the capabilities) and its customization characteristics and stores them in the client content repository 450. In one embodiment, the local content updating module 430 also receives from the server 120 the characteristics of the corresponding native-format content item and stores them in the client content repository 450. In one embodiment, performance of step 560 is delayed until a fast and/or cheap network connection is available to the client 130.

The above description is included to illustrate the operation of certain embodiments and is not meant to limit the scope of the invention. The scope of the invention is to be limited only by the following claims. From the above discussion, many variations will be apparent to one skilled in the relevant art that would yet be encompassed by the spirit and scope of the invention.

The invention claimed is:

1. A method of updating a content item in response to advancing capabilities of a client, comprising:
    storing a local content item received from a server, the local content item having characteristics customized based on prior capabilities of the client;
    determining whether current capabilities of the client exceed characteristics of the local content item customized based on the prior capabilities of the client;
    responsive to determining that the current capabilities of the client exceed the characteristics of the local content item, requesting from the server an updated content item having characteristics customized based on the current capabilities of the client; and
    storing the updated content item as an updated local content item.

2. The method of claim 1, wherein the content item has a plurality of characteristics indicating whether a server content item associated with the local content item includes a plurality of different specialized content types, and wherein the current capabilities of the client indicate which of the plurality of different specialized content types are supported by the client.

3. The method of claim 1, further comprising:
    comparing the characteristics of the local content item with characteristics of a server content item corresponding to the local content item; and
    determining, responsive to the comparison, whether a characteristic of the server content item exceeds a characteristic of the local content item and whether the current capabilities of the client support the characteristic of the server content item that exceeds the characteristic of the local content item;

wherein the updated content item is requested from the server responsive to determinations that the characteristic of the server content item exceeds the characteristic of the local content item and that the current capabilities of the client support the characteristic of the server content item that exceeds the characteristic of the local content item.

4. The method of claim 3, wherein determining whether the characteristic of the server content item exceeds the characteristic of the local content item comprises:

receiving, from the server, characteristics of the server content item corresponding to the local content item.

5. The method of claim 3, wherein the server content item is in a native format not customized based on particular capabilities of a client.

6. The method of claim 1, further comprising:

detecting that the current capabilities of the client differ from the prior capabilities of the client;

wherein determining whether current capabilities of the client exceed characteristics of the local content item occurs responsive to a detection that the current capabilities of the client differ from the prior capabilities of the client.

7. The method of claim 1, wherein the local content item comprises an electronic book ("ebook"), and wherein the characteristics customized based on the prior capabilities of the client comprise characteristics for presenting ebook content at the client.

8. A non-transitory computer-readable storage medium storing computer program modules for updating a content item in response to advancing capabilities of a client, the computer program modules executable to perform steps comprising:

storing a local content item received from a server, the local content item having characteristics customized based on prior capabilities of the client;

determining whether current capabilities of the client exceed characteristics of the local content item customized based on the prior capabilities of the client;

responsive to determining that the current capabilities of the client exceed the characteristics of the local content item, requesting from the server an updated content item having characteristics customized based on the current capabilities of the client; and storing the updated content item as an updated local content item.

9. The computer-readable storage medium of claim 8, wherein the content item has a plurality of characteristics indicating whether a server content item associated with the local content item includes a plurality of different specialized content types, and wherein the current capabilities of the client indicate which of the plurality of different specialized content types are supported by the client.

10. The computer-readable storage medium of claim 8, wherein the steps further comprise:

comparing the characteristics of the local content item with characteristics of a server content item corresponding to the local content item; and determining, responsive to the comparison, whether a characteristic of the server content item exceeds a characteristic of the local content item and whether the current capabilities of the client support the characteristic of the server content item that exceeds the characteristic of the local content item;

and wherein the updated content item is requested from the server responsive to determinations that the characteristic of the server content item exceeds the characteristic of the local content item and that the current capabilities of the client support the characteristic of the server content item that exceeds the characteristic of the local content item.

11. The computer-readable storage medium of claim 10, wherein determining whether the characteristic of the server content item exceeds the characteristic of the local content item comprises:

receiving, from the server, characteristics of the server content item corresponding to the local content item.

12. The computer-readable storage medium of claim 10, wherein the server content item is in a native format not customized based on particular capabilities of a client.

13. The computer-readable storage medium of claim 8, wherein the steps further comprise:

detecting that the current capabilities of the client differ from the prior capabilities of the client;

and wherein determining whether current capabilities of the client exceed characteristics of the local content item occurs responsive to a detection that the current capabilities of the client differ from the prior capabilities of the client.

14. The computer-readable storage medium of claim 8, wherein the local content item comprises an electronic book ("ebook"), and wherein the characteristics customized based on the prior capabilities of the client comprise characteristics for presenting ebook content at the client.

15. A system for updating a content item in response to advancing capabilities of a client, comprising:

a non-transitory computer-readable storage medium storing computer program modules executable to perform steps comprising:

storing a local content item received from a server, the local content item having characteristics customized based on prior capabilities of the client;

determining whether current capabilities of the client exceed characteristics of the local content item customized based on the prior capabilities of the client;

responsive to determining that the current capabilities of the client exceed the characteristics of the local content item, requesting from the server an updated content item having characteristics customized based on the current capabilities of the client; and storing the updated content item as an updated local content item; and a computer processor for executing the computer program modules.

16. The system of claim 15, wherein the content item has a plurality of characteristics indicating whether a server content item associated with the local content item includes a plurality of different specialized content types, and wherein the current capabilities of the client indicate which of the plurality of different specialized content types are supported by the client.

17. The system of claim 15, wherein the steps further comprise:

comparing the characteristics of the local content item with characteristics of a server content item corresponding to the local content item; and determining, responsive to the comparison, whether a characteristic of the server content item exceeds a characteristic of the local content item and whether the current capabilities of the client support the characteristic of the server content item that exceeds the characteristic of the local content item;

and wherein the updated content item is requested from the server responsive to determinations that the characteristic of the server content item exceeds the characteristic of the local content item and that the current capabilities of the client support the characteristic of the server content item that exceeds the characteristic of the local content item.

18. The system of claim 17, wherein determining whether the characteristic of the server content item exceeds the characteristic of the local content item comprises:
   receiving, from the server, characteristics of the server content item corresponding to the local content item.

19. The system of claim 17, wherein the server content item is in a native format not customized based on particular capabilities of a client.

20. The system of claim 15, wherein the steps further comprise:
   detecting that the current capabilities of the client differ from the prior capabilities of the client;
and wherein determining whether current capabilities of the client exceed characteristics of the local content item occurs responsive to a detection that the current capabilities of the client differ from the prior capabilities of the client.

* * * * *